May 25, 1943.　　　R. F. BACON ET AL　　　2,320,255
COATING METHOD AND MATERIAL
Filed June 20, 1940

INVENTORS
Raymond F. Bacon
Isaac Bencowitz
BY
Pennie, Davis, Marvin & Edmonds
ATTORNEYS Patented May 25, 1943

2,320,255

UNITED STATES PATENT OFFICE 2,320,255

COATING METHOD AND MATERIAL

Raymond F. Bacon, Bronxville, N. Y., and Isaac Bencowitz, Newgulf, Tex., assignors to Texas Gulf Sulphur Company, Houston, Tex., a corporation of Texas Application June 20, 1940, Serial No. 341,506

6 Claims. (Cl. 117—46)

This invention relates to the coating or application of asphalt to various surfaces and articles and has for its object the provision of an improved method of applying the asphalt to surfaces such as stone, brick, concrete, pavement, metal and the like. The invention aims to provide an improved method of applying the asphalt as a film, coating, layer, adhesive or bonding medium (hereinafter called a "coating") on such surfaces.

In forming a coating mixture for use in practicing the invention, asphalt is mixed with one or more compounds capable of increasing the fluidity of the asphalt that are quite volatile, inflammable and easily ignitable at ordinary temperatures. While practically any kind of commercial asphalt may be used, we have found the so-called Texas and Mexican steam and air blown asphalts to be satisfactory, and, particularly, asphalts which have a penetration of 32 to 35 and 45 to 55 at 77° F. for five seconds under a hundred gram weight. Compounds such as naphtha, benzine, benzene, coal distillation products and in general the low-temperature distillation fractions of petroleum are especially suitable for producing the mixture. The compound or mixtures of the compounds (hereinafter called the "inflammable organic compound") may be mixed with or beaten into the asphalt as a sort of emulsion. We prefer to use an inflammation organic compound having a low-ignition temperature which is capable of dissolving the asphalt and forming a fluid product which may be sprayed, poured or used as a paint at ordinary temperatures. The asphalt and inflammable organic compound will hereinafter, for convenience, be referred to as the "asphaltic mixture" or simply as the "mixture."

The thermoplastic characteristics of the asphalt coating may be changed to meet various conditions and we may mix various quantities of elemental sulphur with the asphalt for that purpose. The sulphur also imparts toughness to the coating. While the sulphur may be used in small or large quantities, we have found the best results are obtained by using from six to ten percent of sulphur. When sulphur is used it is mixed with or incorporated in the asphalt before the inflammable agent is added to the asphalt. The sulphur is homogeneously disseminated in the asphalt in the manner of a solution but the temperature is not raised to a point where the asphalt and sulphur combine chemically. When sulphur is present in the mixture, care must be taken in burning on the coating that the temperature does not reach a point where the asphalt and sulphur combine chemically.

In forming the coating in accordance with the method of the invention, the asphaltic mixture is ignited during its application to the surface to consume the inflammable agent, either in part or substantially in its entirety, to increase the fluidity of the asphalt and to effect a tenacious bonding to the coated surface. A particularly effective application of the invention involves spraying a mixture of the asphalt and inflammable agent on the surface to be coated and igniting the mixture as it is discharged from the spray nozzle.

In applying the asphaltic mixture by spraying, we prefer to charge the mixture and air out of a nozzle in the form of an atomized spray and to ignite the spray causing the inflammable organic compound to burn at least partially before the spray contacts the surface to be coated. The asphalt becomes quite fluid before it strikes the surface and the inflammable organic compound continues to burn on the surface until it is more or less all consumed depending upon the volatility of the agent and the temperature of the surface. Various spraying devices such as are commonly used for spraying paint and lacquer may be used and we prefer to provide another nozzle arranged to maintain a flame near the spray nozzle to insure the continued burning of the inflammable organic compound.

The accompanying drawing illustrates a form of spraying device suitable for use in practicing a method of the invention, in which.

Figure 1:
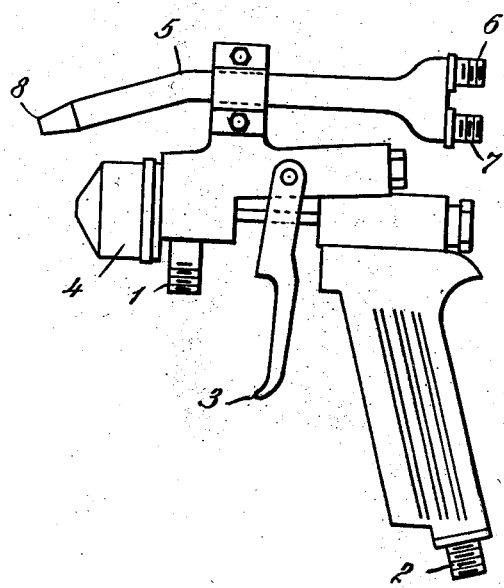
Fig. 1 is a side elevational view.
Figure 2:
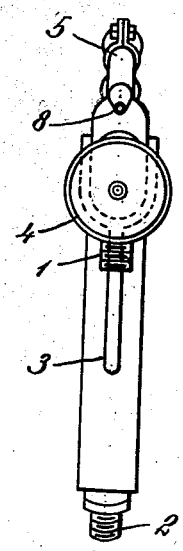
Fig. 2 is a front view.

We prefer to use a spraying device of the type illustrated comprising a pipe or hose connection 1 for the supply of compressed gas, preferably air, a pipe or hose connection 2 for supplying the asphaltic mixture under pressure, a regulating trigger 3 and a nozzle 4, preferably of the type which discharges the asphaltic mixture in a whirling atomized spray. It is, of course, understood that the asphaltic mixture contains a sufficient amount of inflammable organic compound and the temperature is such that it is sufficiently fluid to be readily atomized at the pressure used, and that the pressure of the air passing through connection 1 is such as to aid in the atomization of the asphaltic mixture.

While it is practical, when using highly volatile inflammable organic compounds and when the temperature is relatively high, to ignite the spray in the manner of an ordinary torch and continue to use it as a flaming spray, we prefer to use a special flame tip to insure a continuous burning action. To this end, we attach a flame tip 5 to the spraying device, which is provided with suitable connections 6 and 7 for connecting the tip to a source of oxygen or air under pressure and a source of gas respectively. The flame end of the tip 8 is arranged to cause the flame to impinge on the spray.

The application of the coating as a spray is especially suited when large and heavy articles such as concrete pipes or walls are to be coated. The ignition of the spray and its application to the surface results in the deposition of a highly fluid layer of asphalt that enters the fine cracks and pores of the surface and effects a tenacious bond thereto. The volatile agent may be fairly well consumed before the asphalt strikes the surface and there may be some continued burning after the coating has formed. In applying the coating as a spray to a concrete wall, for example, a mixture of 5 parts of asphalt and 6 parts of naphtha (86 Bé.) each by weight; or a similar mixture containing 1 part by weight of sulphur gives satisfactory results. It is, of course, understood that these quantities are only illustrative and that various proportions of the materials may be used.

The burning-spray method is especially efficacious where large areas of thin metal are to be coated. Since the metal has low heat absorbing capacity, there is a tendency for the asphalt to become overheated and burned and this condition is overcome by using a spray in which most of the volatile agent is burned before the mixture strikes the surface.

The process of the invention seems to drive moisture out of the asphalt and there is a definite indication that the heat removes even the smallest traces of moisture adhering to the surface. While there may be some physical or chemical change in the characteristics of the asphalt as a result of the burning of the inflammable agent, it appears that the unusual tenacity with which the asphalt adheres to the surface may be due to a more or less freedom from moisture at the point of contact.

The bond between the asphalt coating and concrete, for example, is so adhering that it provides an intermediate priming coating for surfacing concrete with other materials which by themselves do not adhere to the concrete. Asphalt-aggregate paving mixtures with or without sulphur, as well as sulphur itself, can be made to stick to concrete previously coated with a layer of asphalt according to this method. Paving bricks, for example, may be coated and thereafter stuck together by the application of ordinary asphalt between the bricks. Concrete blocks, for example, coated by means of the method of the invention, seem to be impermeable to water. The method of the invention provides an excellent water-proofing coating.

We claim:

1. The method of forming an asphalt coating which comprises spraying an asphaltic fluid mixture of asphalt and an inflammable organic compound in the direction of the surface to be coated, and igniting the spray and burning off a part of the inflammable agent, thereby heating the asphalt to a relatively high state of fluidity before it strikes the said surface and forming an asphalt coating which adheres to the surface with great tenacity.

2. The method of forming an asphalt coating which comprises spraying an asphaltic fluid mixture of asphalt and an easily volatilizable organic compound which is highly inflammable in the direction of the surface to be coated, and igniting the spray and burning off a part of the organic compound thereby heating the asphalt to a relatively high state of fluidity and causing the asphalt to adhere to the surface with great tenacity.

3. The method according to claim 1 in which the inflammable organic compound is a solvent for the asphalt and is used in such quantity as to form an asphaltic mixture which is sufficiently fluid at ordinary temperatures that it may be sprayed or used as a paint.

4. The method according to claim 2 in which the easily volatilizable organic compound is a solvent for the asphalt and is used in such quantity as to form an asphaltic mixture which is sufficiently fluid at ordinary temperatures that it may be sprayed or used as a paint.

5. The method according to claim 1 in which the asphalt has sufficient elemental sulphur incorporated therein to effect a material alteration in its thermoplastic characteristics.

6. The method according to claim 2 in which the asphalt has sufficient elemental sulphur incorporated therein to effect a material alteration in its thermoplastic characteristics.

RAYMOND F. BACON.
ISAAC BENCOWITZ.